(12) United States Patent
Thorsell et al.

(10) Patent No.: US 10,077,592 B1
(45) Date of Patent: Sep. 18, 2018

(54) CONSOLE BOX

(71) Applicant: TOYODA GOSEI CO., LTD., Kiyosu-shi, Aichi-ken (JP)

(72) Inventors: Roy C. Thorsell, Wixon, MI (US); James R. Sand, Farmington Hills, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/592,269

(22) Filed: May 11, 2017

(51) Int. Cl.
| | |
|---|---|
| *B65D 51/04* | (2006.01) |
| *E05F 17/00* | (2006.01) |
| *B60R 7/04* | (2006.01) |
| *E05F 1/10* | (2006.01) |

(52) U.S. Cl.
CPC .............. *E05F 17/004* (2013.01); *B60R 7/04* (2013.01); *E05F 1/105* (2013.01); *E05F 2017/008* (2013.01); *E05Y 2900/53* (2013.01)

(58) Field of Classification Search
CPC .... E05F 17/004; E05F 1/105; E05F 2017/008
USPC .............................................. 296/24.34, 37.8
See application file for complete search history.

(56) References Cited

U.S. PATENT DOCUMENTS

| | | | |
|---|---|---|---|
| 6,616,205 B2* | 9/2003 | Bruhnke | ................... B60R 7/04 224/275 |
| 7,064,285 B2 | 6/2006 | Ichimaru | |
| 7,407,200 B2 | 8/2008 | Ichimaru | |
| 8,740,265 B2* | 6/2014 | Gillis | ...................... E05B 83/32 292/199 |
| 2008/0035657 A1* | 2/2008 | Yamashita | ................ B60R 7/04 220/826 |

* cited by examiner

*Primary Examiner* — Pinel E Romain
(74) *Attorney, Agent, or Firm* — Posz Law Group, PLC (57) ABSTRACT

A console box includes a box body that includes an opening portion, a lid supported by a hinge shaft on the box body, and an opening/closing mechanism that tilts the lid. The opening/closing mechanism includes a main rack that includes an engaging portion and a sub-rack that includes an engaged portion. When the lid is tilted between an opened position and a closed position, the engaged portion engages the engaging portion and restricts sliding of the sub-rack on the main rack. When the lid is further tilted from the closed position in a closing direction in which the lid closes the opening portion and when the lid is further tilted from the opened position in an opening direction in which the lid opens the opening portion, the engaged portion is disengaged from the engaging portion to cancel the restriction imposed on the sub-rack by the main rack.

9 Claims, 7 Drawing Sheets

Upper
Left ↔ Right
Lower

CONSOLE BOX

BACKGROUND OF THE INVENTION

The present invention relates to a console box.

A console box that accommodates small objects may be arranged between a driver seat and a passenger seat in a vehicle. One embodiment of a known console box includes a box body having an opening portion, a lid supported by a hinge shaft on the box body, an opening/closing mechanism that tilts the lid between an opened position where the lid opens the opening portion and a closed position where the lid closes the opening portion. U.S. Pat. No. 7,407,200 discloses an example of a console box including two lids and an opening/closing mechanism that has a plurality of gears. The two lids are arranged next to each other in the widthwise direction of a vehicle. In the console box, the opening/closing mechanism tilts the two lids about the corresponding hinge shafts in opposite directions to open and close the opening portion.

In the conventional console box, when the two lids are tilted to the closed position about the hinge shafts, the lids close the opening portion. When the two lids are tilted to the opened position about the two hinge shafts, the lids greatly open the opening portion.

When the lids have been tilted to the closed position, the vehicle occupant may apply force to a lid that further tilts the lid in the closing direction from the closed position. When the lids have been tilted to the opened position, the vehicle occupant may apply force to a lid in the opening direction that further tilts the lid in the opening direction from the opened position. No measures have been taken against such an erroneous operation of the lids in the conventional console box. Thus, erroneous operation of a lid will apply excessive load to the opening/closing mechanism. This causes adjacent gears to mesh with one another at improper positions. As a result, the opening/closing mechanism may not function properly and close and open the two lids at different timings.

Such a problem is not limited to the type of console box described above that uses two lids to entirely open and close the opening portion but may also occur in a console box that uses a single lid to entirely open and close the opening portion.

SUMMARY OF THE INVENTION

It is an object of the present invention to provide a console box that allows for proper activation of an opening/closing mechanism even when a lid is erroneously operated.

A console box that solves the above problem includes a box body that includes an opening portion, a lid supported by a hinge shaft on the box body, and an opening/closing mechanism that tilts the lid between an opened position where the lid opens the opening portion and a closed position where the lid closes the opening portion. The opening/closing mechanism includes a first pinion arranged on the hinge shaft and integrally rotatable with the hinge shaft, a second pinion separated from the first pinion and supported rotatably, a main rack that meshes with the second pinion and slides when the second pinion rotates, and a sub-rack that meshes with the first pinion and slides on the main rack. The main rack includes an engaging portion. The sub-rack includes an engaged portion. When the lid is tilted between the opened position and the closed position, the engaged portion engages the engaging portion and restricts sliding of the sub-rack on the main rack. When the lid is further tilted from the closed position in a closing direction in which the lid closes the opening portion and when the lid is further tilted from the opened position in an opening direction in which the lid opens the opening portion, the engaged portion is disengaged from the engaging portion to cancel the restriction imposed on the sub-rack by the main rack.

DETAILED DESCRIPTION OF THE PREFERRED EMBODIMENTS

One embodiment of a console box will now be described with reference to the drawings.

In the following description, the front is the direction in which the vehicle moves forward (forward direction), the rear is the direction in which the vehicle moves rearward, and the vertical direction is the height-wise direction of the vehicle. Further, the frame of reference for the widthwise direction (sideward direction) is based on a view taken from the rear of the vehicle.

Figure 1:
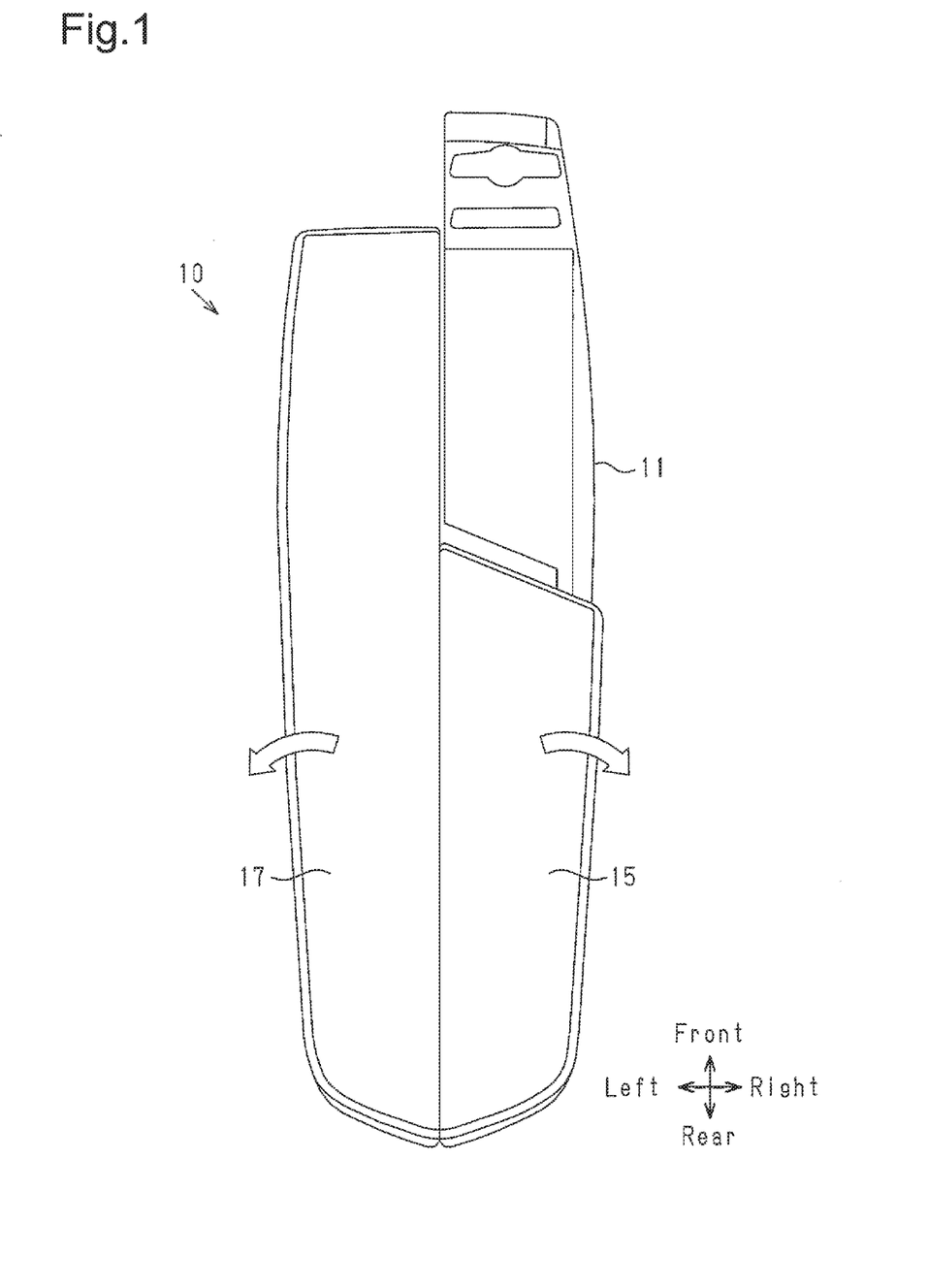
FIG. 1 is a plan view showing a console box.
Figures 2A, 2B, 2C:
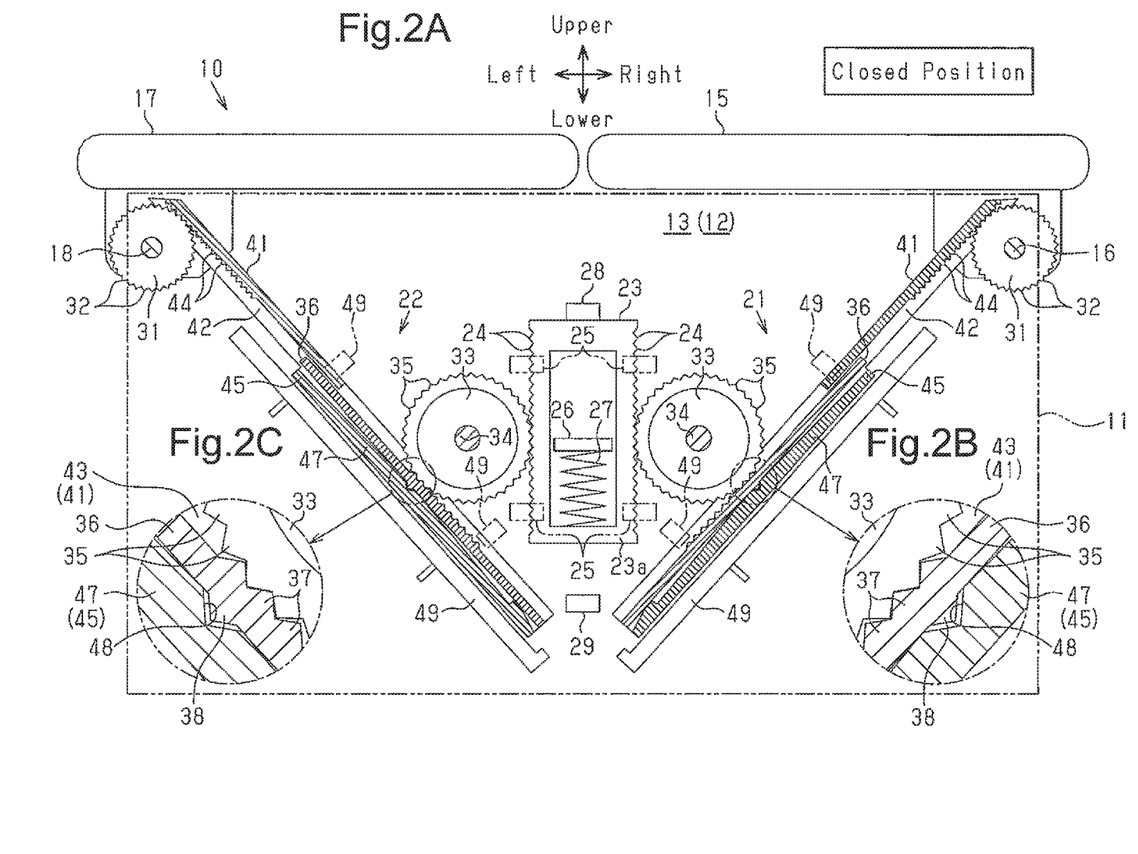
FIG. 2A is a cross-sectional view showing two lids and two opening/closing mechanisms when the two lids are located at closed positions.
FIG. 2B is a partially enlarged cross-sectional view of FIG. 2A.
FIG. 2C is a partially enlarged cross-sectional view of FIG. 2A.

A console box 10 shown in FIGS. 1 and 2A is located between a driver seat and a passenger seat that are arranged next to each other in the widthwise direction of the vehicle. The console box 10 includes a box body 11 coupled to a floor of the vehicle, two lids 15 and 17 arranged next to each other on the box body 11 in the widthwise direction, and opening/closing mechanisms 21 and 22 that are respectively provided for the lids 15 and 17. The box body 11 includes an accommodation recess 12 that accommodates small objects. The upper end of the accommodation recess 12 includes an opening portion 13.

The right lid 15 is elongated in the front-to-rear direction and supported by a hinge shaft 16 on the right upper end of the box body 11. The left lid 17 is elongated in the front-to-rear direction and supported by a hinge shaft 18 on the left upper end of the box body 11.

Figures 5A, 5B, 5C:
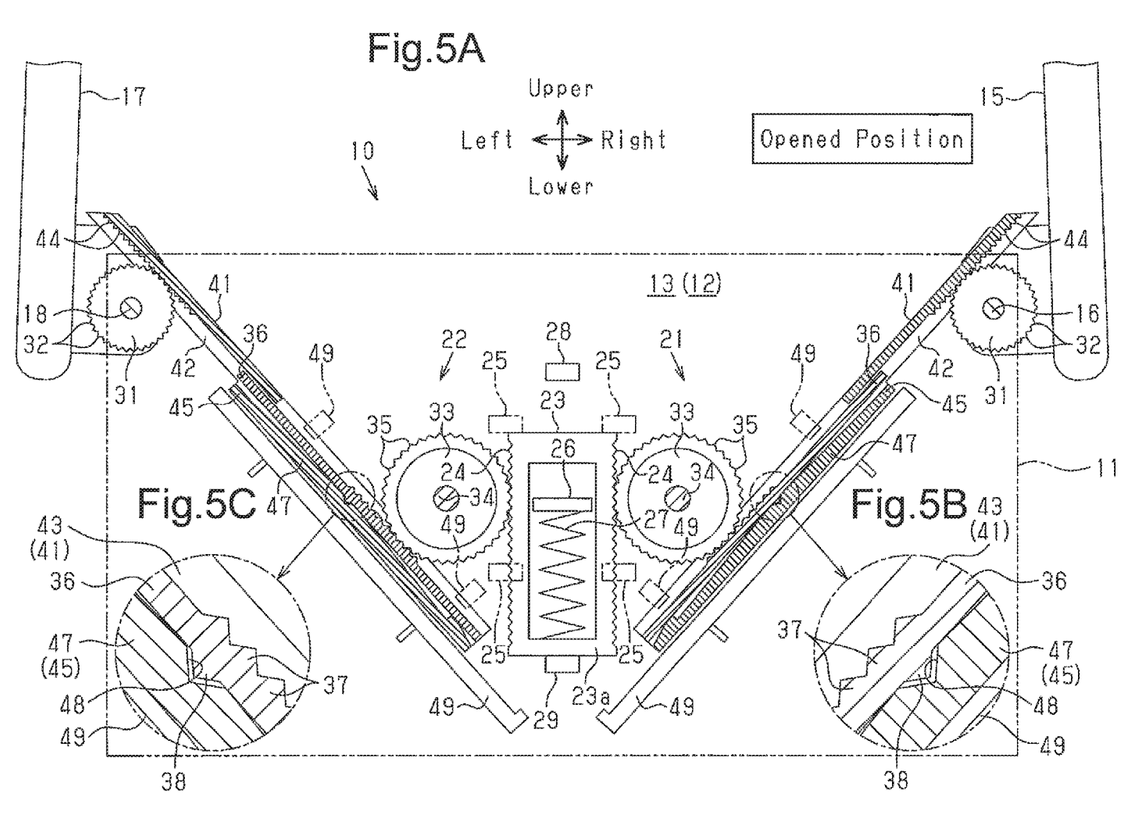
FIG. 5A is a partial, cross-sectional view showing the two lids and the two opening/closing mechanisms when the two lids are located at opened positions.
FIG. 5B is a partially enlarged cross-sectional view of FIG. 5A.
FIG. 5C is a partially enlarged cross-sectional view of FIG. 5A.

The right opening/closing mechanism 21 tilts the right lid 15 between an opened position and a closed position. When located at the closed position, the right lid 15 is generally horizontal as shown in FIG. 2A and closes the right part of the opening portion 13. When located at the opened position, the right lid 15 is generally vertical as shown in FIG. 5A and greatly opens the right part of the opening portion 13.

The left opening/closing mechanism 22 tilts the left lid 17 between an opened position and a closed position. When located at the closed position, the left lid 17 is generally horizontal as shown in FIG. 2A and closes the left part of the opening portion 13. When located at the opened position, the left lid 17 is generally vertical as shown in FIG. 5A and greatly opens the left part of the opening portion 13.

The two lids 15 and 17 are tilted in opposite directions. More specifically, the right lid 15 is tilted in the clockwise direction when the right lid 15 is moved from the closed position to the opened position, and the left lid 17 is tilted in the counterclockwise direction when the left lid 17 is moved from the closed position to the opened position. The right lid 15 is tilted in the counterclockwise direction when the right lid 15 is moved from the opened position to the closed position, and the left lid 17 is tilted in the clockwise direction when the left lid 17 is moved from the opened position to the closed position.

The opening/closing mechanisms 21 and 22 tilt the two lids 15 and 17 in opposite directions but have the same structure. That is, the opening/closing mechanisms 21 and 22 have the same structure but include corresponding members having the same function that are arranged in line symmetry.

As shown in FIG. 2A, each of the opening/closing mechanisms 21 and 22 includes a drive rack 23, an elastic member 27, sliding restriction portions 28 and 29, a first pinion 31, a second pinion 33, a main rack 36, and a sub-rack 41. Among these members, the drive rack 23, the elastic member 27, and the sliding restriction portions 28 and 29 are shared by the opening/closing mechanisms 21 and 22.

The drive rack 23 has a rectangular shape that is more elongated in the vertical direction than in the sideward direction. The left and right sides of the drive rack 23 include teeth 24 arranged next to each other in the vertical direction. In the box body 11, portions of the left and right sides of the drive rack 23 include supports 25. The drive rack 23 is supported by the supports 25 so that the drive rack 23 is slidable in the vertical direction. The supports 25 function not only to support the drive rack 23 on the box body 11 but also to guide the sliding of the drive rack 23 in the vertical direction. The drive rack 23 surrounds a plate-shaped receiving portion 26 fixed to the box body 11.

The elastic member 27 accumulates elastic energy through deformation. In the present embodiment, a coil spring is used as the elastic member 27. The elastic member 27 is located between the receiving portion 26 and a bottom wall 23a of the drive rack 23 in a state compressed in the vertical direction.

The sliding restriction portions 28 and 29 function as follows.

The sliding restriction portions 28 and 29 allow the drive rack 23 to slide in the vertical direction when the two lids 15 and 17 are tilted between the opened position and closed position.

Figure 6A:
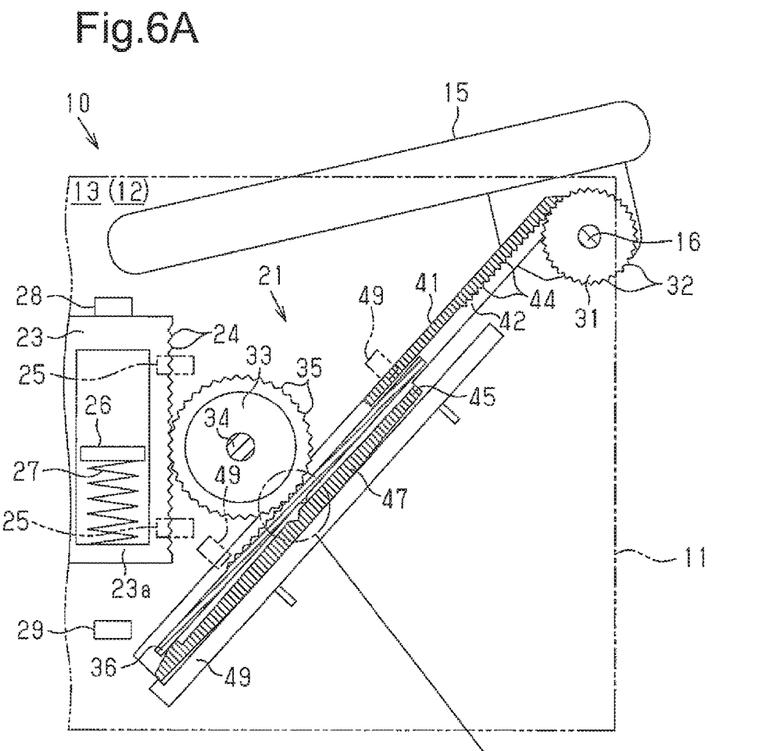
FIG. 6A is a partial, cross-sectional view showing the right opening/closing mechanism and the corresponding lid when the lid is further tilted from the closed position in a closing direction in which the lid closes the opening portion.

The sliding restriction portion 28 restricts upward sliding of the drive rack 23 when the two lids 15 and 17 are further tilted from the closed positions in a closing direction in which the lids 15 and 17 close the opening portion 13 (refer to FIG. 6A).

Figure 7A:
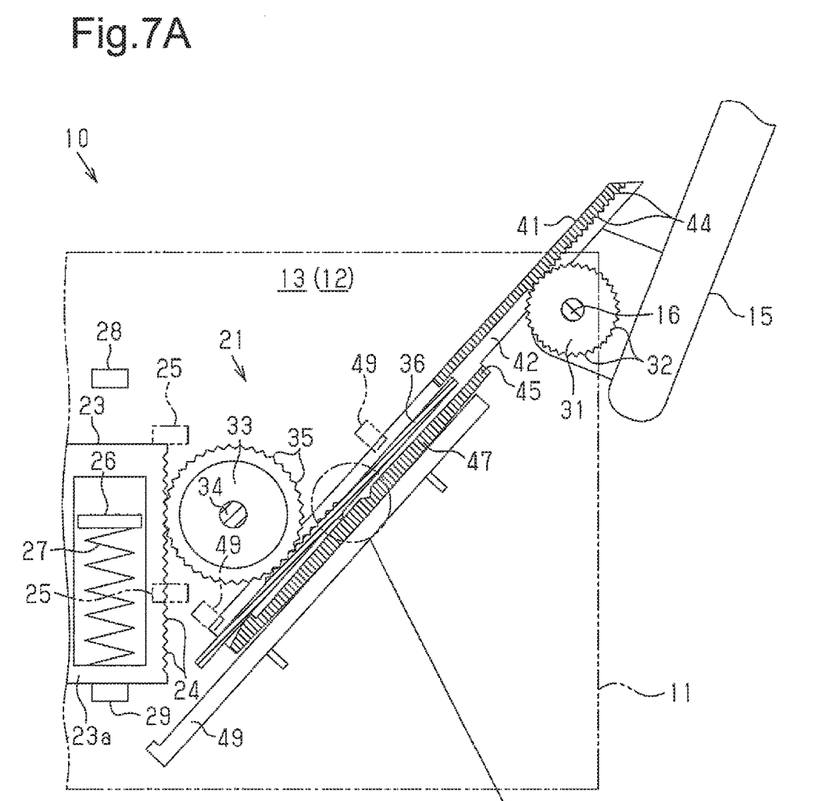
FIG. 7A is a partial, cross-sectional view showing the right opening/closing mechanism and the corresponding lid when the lid is further tilted from the opened position in an opening direction in which the lid opens the opening portion.

The sliding restriction portion 29 restricts downward sliding of the drive rack 23 when the two lids 15 and 17 are further tilted from the opened positions in an opening direction in which the lids 15 and 17 open the opening portion 13 (refer to FIG. 7A).

The sliding restriction portions 28 and 29 are arranged in the box body 11 and located in a sliding path of the drive rack 23. The sliding restriction portions 28 and 29 are separated from each other in the vertical direction. The upper sliding restriction portion 28 is located at a position where the upper sliding restriction portion 28 contacts the upper end surface of the drive rack 23 when the lids 15 and 17 are located at the closed positions (refer to FIG. 2A). The lower sliding restriction portion 29 is located at a position where the lower sliding restriction portion 29 contacts the lower end surface of the drive rack 23 when the lids 15 and 17 are located at the opened positions (refer to FIG. 5A).

The box body 11 includes a holding mechanism (not shown) and a release button (not shown). The holding mechanism holds the drive rack 23 at a portion where the drive rack 23 is in contact with the upper sliding restriction portion 28. The release button is pressed to release the drive rack 23 from the holding mechanism.

Referring to FIG. 2A, the first pinions 31 are rotated integrally with the corresponding hinge shafts 16 and 18, and the outer circumference of each first pinion 31 includes teeth 32 arranged next to one another in the circumferential direction of the first pinion 31. Each first pinion 31 functions to convert rotation into linear motion.

Each second pinion 33 is separated from the corresponding first pinion 31 and located near the drive rack 23. More specifically, each second pinion 33 is located between the drive rack 23 and the first pinion 31. The second pinion 33 is supported by a shaft 34 to be rotatable relative to the box body 11. The outer circumference of each second pinion 33 includes teeth 35 arranged next to one another in the circumferential direction of the second pinion 33. Each second pinion 33 meshes with the opposing left or right side of the drive rack 23. Each second pinion 33 functions to convert rotation into linear motion.

Figure 3A:
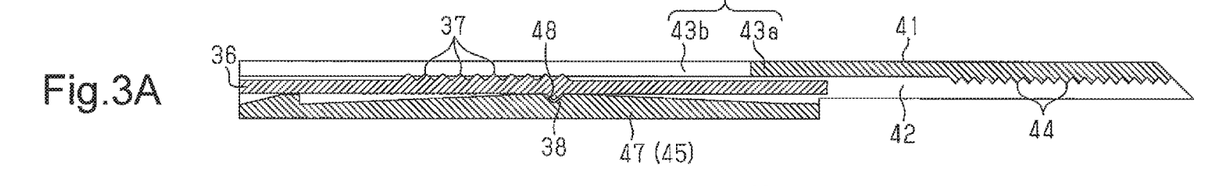
FIG. 3A is a cross-sectional view showing a main rack coupled to a sub-rack.
Figure 3B:
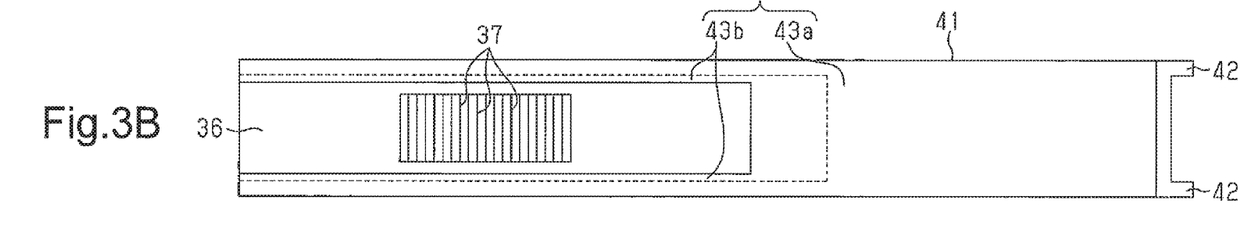
FIG. 3B is a plan view showing the main rack coupled to the sub-rack.
Figure 4A:
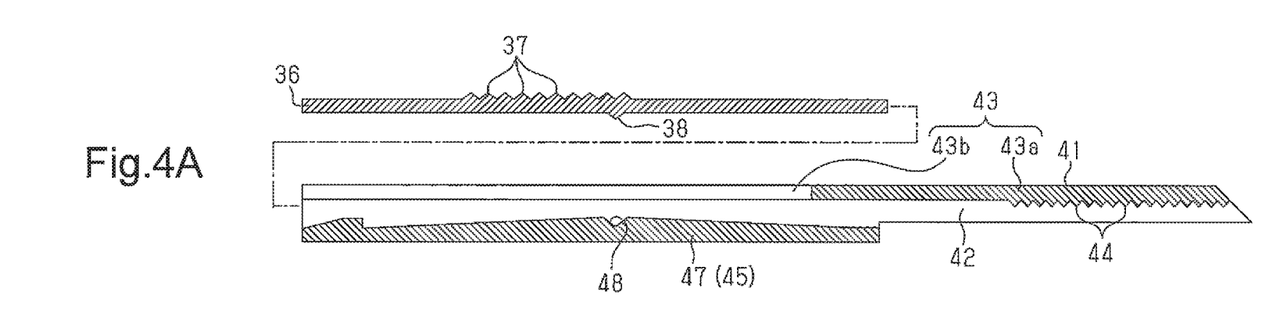
FIG. 4A is a cross-sectional view showing the sub-rack and the main rack before coupled to the sub-rack.
Figure 4B:
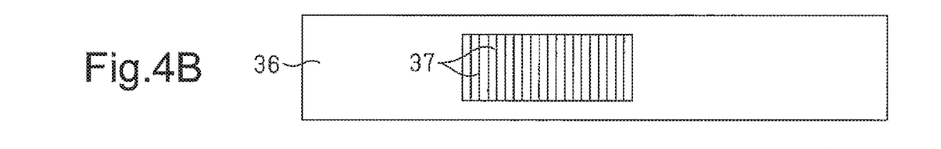
FIG. 4B is a plan view showing the main rack.
Figure 4C:
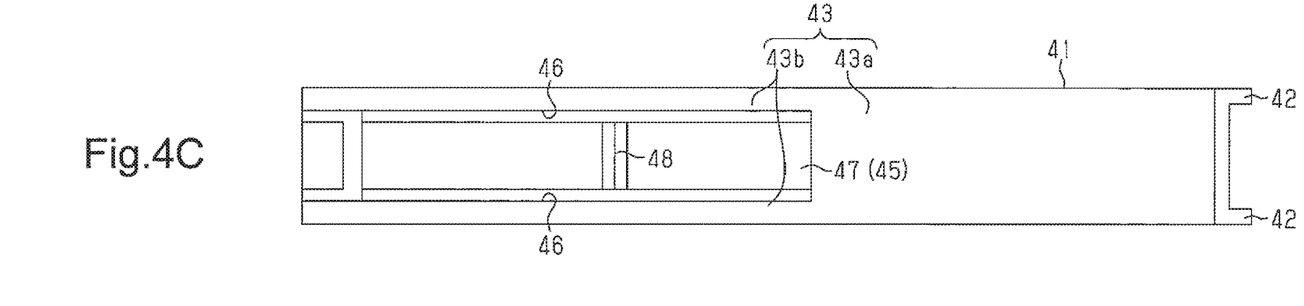
FIG. 4C is a plan view showing the sub-rack.

FIGS. 4A to 4C each show a state before the main rack 36 is coupled to the sub-rack 41 in each of the opening/closing mechanisms 21 and 22. FIGS. 3A to 3C each show a state in which the main rack 36 is coupled to the sub-rack 41 in each of the opening/closing mechanisms 21 and 22. As shown in FIGS. 3A, 3B, 4A, and 4B, each main rack 36 has the form of an elongated plate. The longitudinally middle portion in the upper surface of each main rack 36 includes teeth 37. The teeth 37 are arranged next to one another in the longitudinal direction of the main rack 36. Further, the longitudinally middle portion in the lower surface of the main rack 36 includes an engaging portion 38. The engaging portion 38 is formed by a projection that projects downwardly from the lower surface of the main rack 36.

As shown in FIGS. 3A to 3C, 4A, and 4C, each sub-rack 41 has an elongated shape and includes two vertical walls 42, an upper horizontal wall 43, and a lower horizontal wall 45. Each sub-rack 41 is box-shaped and includes openings in at least two opposite longitudinal ends. The two vertical walls 42 of each sub-rack 41 are separate and parallel to each other in the front-to-rear direction and have the form of elongated plates.

In each sub-rack 41, the upper horizontal wall 43 is located between the upper ends of the two vertical walls 42. The upper horizontal wall 43 has different forms at parts located close to and far from the longitudinally middle portion of the sub-rack 41. The portion of each upper horizontal wall 43 far from the drive rack 23 (right portion in FIG. 3A or the like) is formed by a plate 43a extending between the upper ends of the two vertical walls 42. The portion of each upper horizontal wall 43 close to the drive rack 23 (left portion in FIG. 3A or the like) is formed by two projections 43b extending along the corresponding vertical walls 42 in the longitudinal direction of the sub-rack 41. Each projection 43b partially projects toward the upper end of the opposing vertical wall 42. The plate 43a includes a lower surface having teeth 44. The teeth 44 are arranged next to one another in the longitudinal direction of the sub-rack 41.

In each sub-rack 41, the lower horizontal wall 45 is plate-shaped at the portion close to the drive rack 23 than the longitudinally middle portion of the sub-rack 41 and extended between the lower ends of the two vertical walls 42. Part of the lower horizontal wall 45 overlaps part of the plate 43a in the longitudinal direction of the sub-rack 41.

The boundary of the lower horizontal wall 45 with each vertical wall 42 includes a slit 46 extending in the longitudinal direction of the sub-rack 41. The region of the lower horizontal wall 45 located between the two slits 46 includes a flexible portion 47 that deforms more easily in the thickness-wise direction than when there are no slits 46. The upper surface of the flexible portion 47 at the longitudinally middle portion of the sub-rack 41 includes an engaged portion 48. The engaged portion 48 is formed by a recess that is downwardly recessed and engageable with the engaging portion 38, which is formed by the projection. The thickness-wise direction of the flexible portion 47 corresponds to the direction in which the engaged portion 48 moves toward or away from the engaging portion 38.

As shown in FIG. 2A, the upper and lower portions of each sub-rack 41 in the box body 11 include supports 49 that support the sub-rack 41 so that the sub-rack 41 is slidable in a diagonal direction. The diagonal direction is a direction in which the sub-rack 41 becomes higher as the sub-rack 41 becomes farther from the drive rack 23. The support 49 located at the lower side of each sub-rack 41 has the form of an elongated plate and supports the sub-rack 41 from below with a wide surface. The supports 49 function not only to support the sub-rack 41 on the box body 11 but also to guide the sub-rack 41 when the sub-rack 41 slides.

As shown in FIGS. 3A and 4A, the main rack 36 of each of the opening/closing mechanisms 21 and 22 is located in the sub-rack 41. More specifically, the main rack 36 of each of the opening/closing mechanisms 21 and 22 is located between the upper horizontal wall 43 (all of two projections 43b and part of plate 43a) and the lower horizontal wall 45. The upper horizontal wall 43 and the lower horizontal wall 45 restrict the movement direction of the sub-rack 41 to the direction in which the main rack 36 extends, that is, the direction in which the sub-rack 41 becomes higher as the sub-rack 41 becomes farther from the drive rack 23. As shown in FIGS. 2A to 2C, each of the opening/closing mechanisms 21 and 22 restrict sliding of the sub-rack 41 on the main rack 36 when the engaged portion 48 of the sub-rack 41 is engaged with the engaging portion 38 of the main rack 36. Further, when the engaged portion 48 is disengaged from the engaging portion 38, the restriction is cancelled. This allows the sub-rack 41 to slide on the main rack 36.

The teeth 37 of each main rack 36 meshes with the teeth 35 of the corresponding second pinion 33 (refer to FIGS. 2B and 2C). The teeth 44 of each sub-rack 41 meshes with the teeth 32 of the corresponding first pinion 31 (refer to FIG. 2A).

The operation and advantages of the console box 10 of the present embodiment will now be described for different situations.

As shown in FIGS. 2A to 2C, when the two lids 15 and 17 are located at the closed positions, each of the opening/closing mechanisms 21 and 22 engages the engaged portion 48 with the engaging portion 38 to restrict sliding of the sub-rack 41 on the main rack 36. The holding mechanism (not shown) holds the drive rack 23 so that the drive rack 23 is in contact with the upper sliding restriction portion 28. The elastic member 27 is compressed to apply downward elastic force (biasing force) of the elastic member 27 to the drive rack 23. The teeth 32 of the first pinion 31 of each of the opening/closing mechanisms 21 and 22 mesh with the teeth 44 of the sub-rack 41 located at the upper end. The teeth 35 of the second pinion 33 of each of the opening/closing mechanisms 21 and 22 mesh with the vertically middle teeth 24 of the drive rack 23 and with the teeth 37 located at the upper end of the main rack 36.

The two lids 15 and 17 are generally horizontal when entirely closing the opening portion 13. Thus, the two lids 15 and 17 restrict removal of accommodated objects (small objects or the like), which are accommodated in the accommodation recess 12 of the box body 11, from the accommodation recess 12.

Further, when the two lids 15 and 17 are located at the closed positions, the drive rack 23 is not restricted by the lower sliding restriction portion 29 and is thus slidable downwardly.

A case in which the lids 15 and 17 are tilted to open the opening portion 13 will now be described.

When tilting the two lids 15 and 17 from the closed position to entirely open the opening portion 13, the vehicle occupant presses the release button (not shown). This releases the drive rack 23 from the holding mechanism, eliminates the force that continuously compresses the elastic member 27, and releases the elastic energy of the elastic member 27. As a result, the elastic energy causes the drive rack 23, which is supported by the supports 25, to slide downwardly. This changes the meshed position of the drive rack 23 and the second pinion 33 in each of the opening/closing mechanisms 21 and 22 and rotates the second pinion 33. This also changes the meshed position of the second pinion 33 and the main rack 36 in each of the opening/closing mechanisms 21 and 22 so that the main rack 36 slides diagonally upward.

The elastic force of each flexible portion 47 moves the corresponding engaged portion 48 toward the corresponding engaging portion 38 until the engaged portion 48 is engaged with the engaging portion 38. The engagement restricts sliding of the sub-rack 41 on the main rack 36.

Thus, each sub-rack 41 slides diagonally upward integrally with the corresponding main rack 36. The sliding of each sub-rack 41 changes the meshed position of the sub-rack 41 and the first pinion 31 and rotates the first pinion 31.

The hinge shafts 16 and 18 are rotated integrally with the corresponding first pinions 31, and the two lids 15 and 17 are tilted about the corresponding hinge shafts 16 and 18 toward the opened positions.

As shown in FIG. 5A, when the drive rack 23 slides to where the drive rack 23 contacts the lower sliding restriction portion 29, the sliding restriction portion 29 restricts further downward sliding of the drive rack 23. This stops the rotation of the second pinions 33 in the opening/closing mechanisms 21 and 22, stops the diagonally upward sliding of the main racks 36 and the sub-racks 41, and stops the rotation of the two first pinions 31. Thus, the tilting of the two lids 15 and 17 is stopped at the opened positions.

Each first pinion 31 meshes with the lower teeth 44 of each sub-rack 41. The teeth 35 of each second pinion 33 mesh with the upper teeth 24 of the drive rack 23 and the lower teeth 37 of each main rack 36.

The lids 15 and 17 greatly open the opening portion 13 when generally vertical. This allows the accommodation recess 12 to be accessed so that accommodated objects (small objects or the like) may be accommodated in the accommodation recess 12 through the opening portion 13 and removed from the accommodation recess 12 through the opening portion 13.

In this case, only the release button needs to be pressed. When the release button is pressed to release the drive rack 23 from the holding mechanism, the elastic energy of the elastic member 27 downwardly slides the drive rack 23, which is shared by the opening/closing mechanisms 21 and 22, and automatically drives the second pinion 33, the main rack 36, the sub-rack 41, and the first pinion 31 of each of the opening/closing mechanisms 21 and 22. This eliminates the need to directly touch and tilt the lids 15 and 17. As a result, the operation for opening the opening portion 13 is simplified.

Further, when the two lids 15 and 17 are located at the opened positions as described above, the drive rack 23 is not restricted by the upper sliding restriction portion 28 and is thus slidable upwardly.

A case in which the lids 15 and 17 are tilted to close the opening portion 13 will now be described.

When tilting the two lids 15 and 17 from the opened positions to entirely close the opening portion 13 as described above, at least one of the lids 15 and 17, for example, the right lid 15, is manually pushed in the direction in which the right lid 15 closes the right part of the opening portion 13 against the biasing force of the elastic member 27. When the pushed lid 15 is tilted about the hinge shaft 16 in the counterclockwise direction, the first pinion 31 of the right opening/closing mechanism 21 is rotated in the counterclockwise direction integrally with the hinge shaft 16. This changes the meshed position of the first pinion 31 and the sub-rack 41 and slides the sub-rack 41 diagonally downward.

The main rack 36 in which the engaging portion 38 engages the engaged portion 48 slides diagonally downward integrally with the sub-rack 41. The sliding of the main rack 36 changes the meshed position of the teeth 37 and the teeth 35 and rotates the second pinion 33 in the clockwise direction. This changes the meshed position of the second pinion 33 and the drive rack 23 and slides the drive rack 23 upwardly while compressing the elastic member 27. The elastic member 27 accumulates elastic energy through the compression.

The upward sliding of the drive rack 23 is transmitted to the left hinge shaft 18 through the second pinion 33, the main rack 36, the sub-rack 41, and the first pinion 31 of the left opening/closing mechanism 22. The second pinion 33 and the first pinion 31 are rotated in a direction opposite to the direction in which the second pinion 33 and the first pinion 31 of the right opening/closing mechanisms 21 are rotated. The main rack 36 and the sub-rack 41 of the left opening/closing mechanism 21 integrally slide diagonally downward. This tilts the left lid 17 about the hinge shaft 18 in the clockwise direction and closes the left part of the opening portion 13.

As shown in FIG. 2A, when the drive rack 23 slides to where the drive rack 23 contacts the upper sliding restriction portion 28, the sliding restriction portion 28 restricts further upward sliding of the drive rack 23. This stops the rotation of the second pinions 33 in the opening/closing mechanisms 21 and 22, stops diagonally downward sliding of the main racks 36 and the sub-racks 41, and stops the rotation of the two first pinions 31. Thus, the tilting of the two lids 15 and 17 are stopped at the closed positions. Further, the holding mechanism keeps the drive rack 23 in contact with the upper sliding restriction portion 28.

The lids 15 and 17 entirely close the opening portion 13 when generally horizontal. Further, the elastic member 27 is kept compressed. In addition, the release button returns to the state that it was in before being pressed.

In this case, only one of the lids 15 and 17 needs to be manually pushed in the direction for closing the opening portion 13.

A case in which at least one of the lids 15 and 17 is further tilted from the closed position in the closing direction in which the lid 15 or 17 closes the opening portion 13 will now be described.

As shown in FIGS. 2A to 2C, when the lids 15 and 17 are located at the closed positions, the upper sliding restriction portion 28 is in contact with the drive rack 23 and restricts further upward sliding of the drive rack 23.

Thus, when a vehicle occupant applies further downward force to at least one of the lids 15 and 17, for example, the right lid 15, and tilts the right lid 15 from the closed position, the drive rack 23 does not slide upwardly, the second pinion 33 does not rotate, and the main rack 36 does not slide diagonally downward.

Figure 6B:
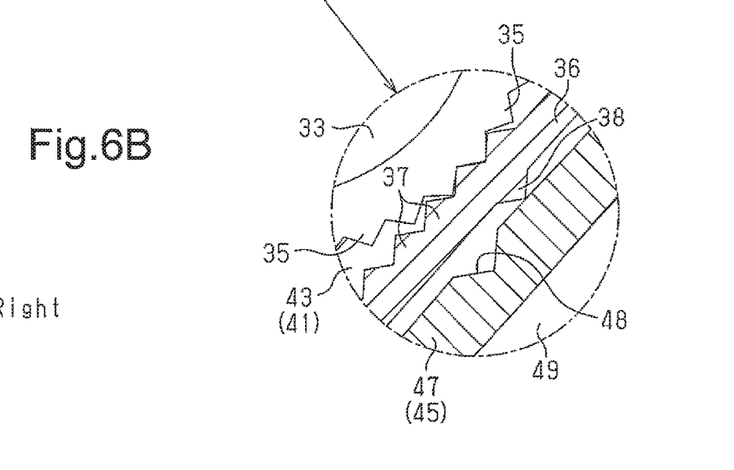
FIG. 6B is a partially enlarged cross-sectional view of FIG. 6A.

The tilting of the right lid 15 rotates the hinge shaft 16 and the first pinion 31 in the counterclockwise direction. This applies force to the sub-rack 41 to slide the sub-rack 41 diagonally downward. As the tilting of the lid 15 increases the force, the flexible portion 47 elastically deforms away from the engaging portion 38 in the thickness-wise direction and decreases the force of the flexible portion 47 engaging the engaged portion 48 with the engaging portion 38. As shown in FIGS. 6A and 6B, when the force that slides the sub-rack 41 diagonally downward overcomes the force of the flexible portion 47 engaging the engaged portion 48 with the engaging portion 38, the engaged portion 48 is separated diagonally downward from the engaging portion 38 so that the engaged portion 48 is disengaged from the engaging portion 38. The disengagement allows the sub-rack 41 to slide diagonally downward on the main rack 36.

Thus, as compared to when the sub-rack 41 does not slide on the main rack 36, the first pinion 31, the second pinion 33, the main rack 36, and the sub-rack 41 are less likely to receive excessive load. This solves problems in which each first pinion 31 meshes with the corresponding sub-rack 41 at improper positions and each second pinion 33 meshes with the corresponding main rack 36 at improper positions, which would occur when excessive load is applied. Further, the two lids 15 and 17 are less likely to open and close at different timings, which would occur when the meshed positions change.

Thus, the present embodiment protects and properly drives the right opening/closing mechanism 21 even when the right lid 15 is erroneously tilted in the closing direction from the closed position where the right lid 15 closes the right part of the opening portion 13. In the same manner, the left opening/closing mechanism 22 is operated and properly driven even when the left lid 17 is erroneously tilted in the closing direction from the closed position where the left lid 17 closes the left part of the opening portion 13.

Even when the right lid 15 is erroneously operated as described above thereby disengaging the engaged portion 48 from the engaging portion 38 diagonally downward, the engaged portion 48 is reengaged with the engaging portion 38 by lifting and tilting the lid 15 toward the closed position in the clockwise direction. That is, the tilting of the right lid 15 in the clockwise direction rotates the hinge shaft 16 in the clockwise direction together with the first pinion 31 and slides the sub-rack 41 diagonally upward on the main rack 36. When the sliding moves the engaged portion 48 in the same direction and engages the engaged portion 48 with the engaging portion 38, further sliding of the sub-rack 41 on the main rack 36 is restricted. As a result, the right opening/closing mechanism 21 returns to the proper state that the opening/closing mechanism 21 was in before being erroneously operated.

Even when the left lid 17 is erroneously operated as described above to disengage the engaged portion 48 from the engaging portion 38 diagonally downward, the engaged portion 48 is reengaged with the engaging portion 38 by lifting and tilting the lid 17 toward the closed position in the counterclockwise direction.

A case in which at least one of the lids 15 and 17 is further tilted from the opened position in the opening direction in which the lid 15 or 17 opens the opening portion 13 will now be described.

As shown in FIGS. 5A to 5C, when the lids 15 and 17 are located at the opened positions, the lower sliding restriction portion 29 is in contact with the drive rack 23 and restricts further downward sliding of the drive rack 23.

Thus, when the vehicle occupant applies further upward force to at least one of the lids 15 and 17, for example, the right lid 15, and tilts the right lid 15 from the opened position in the clockwise direction, the drive rack 23 does not slide downwardly, the second pinion 33 does not rotate, and the main rack 36 does not slide.

Figure 7B:
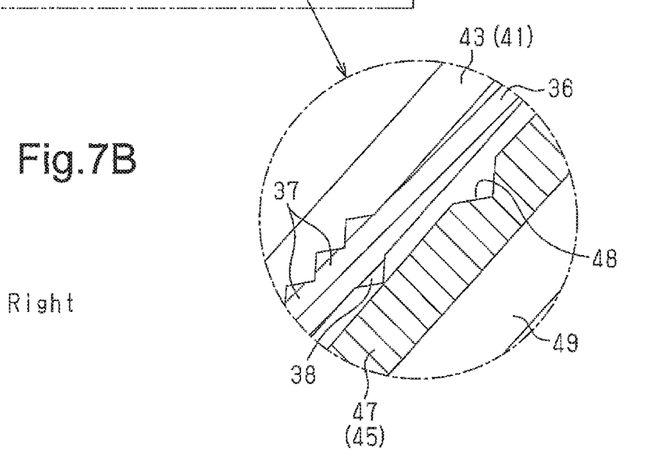
FIG. 7B is a partially enlarged cross-sectional view of FIG. 7A.

The tilting of the right lid 15 rotates the hinge shaft 16 and the first pinion 31 in the clockwise direction. This applies force to the sub-rack 41 to slide the sub-rack 41 diagonally upward. As the tilting of the lid 15 increases the force, the flexible portion 47 elastically deforms away from the engaging portion 38 in the thickness-wise direction and decreases the force of the flexible portion 47 engaging the engaged portion 48 with the engaging portion 38. As shown in FIGS. 7A and 7B, when the force that slides the sub-rack 41 diagonally upward overcomes the force of the flexible portion 47 engaging the engaged portion 48 with the engaging portion 38, the engaged portion 48 is separated diagonally upward from the engaging portion 38 so that the engaged portion 48 is disengaged from the engaging portion 38. The disengagement allows the sub-rack 41 to slide diagonally upward on the main rack 36.

Thus, as compared to when the sub-rack 41 does not slide on the main rack 36, the first pinion 31, the second pinion 33, the main rack 36, and the sub-rack 41 are less likely to receive excessive load. This solves problems in which each first pinion 31 meshes with the corresponding sub-rack 41 at improper positions and each second pinion 33 meshes with the corresponding main rack 36 at improper positions, which would be caused when excessive load is applied. Further, the two lids 15 and 17 are less likely to open and close at different timings, which would occur when the meshed positions change.

Thus, the present embodiment protects and properly drives the right opening/closing mechanism 21 even when the right lid 15 is erroneously tilted in the opening direction from the opened position where the right lid 15 opens the right part of the opening portion 13. In the same manner, the left opening/closing mechanism 22 is operated and properly driven even when the left lid 17 is erroneously tilted in the opening direction from the opened position where the left lid 17 opens the left part of the opening portion 13.

Even when the right lid 15 is erroneously operated as described above thereby disengaging the engaged portion 48 from the engaging portion 38 diagonally upward, the engaged portion 48 is reengaged with the engaging portion 38 by pushing and tilting the lid 15 toward the opened position in the counterclockwise direction. That is, the tilting of the right lid 15 in the counterclockwise direction rotates the hinge shaft 16 in the counterclockwise direction together with the first pinion 31 and slides the sub-rack 41 diagonally downward on the main rack 36. The sliding engages the engaged portion 48 with the engaging portion 38. This restricts further sliding of the sub-rack 41 on the main rack 36. As a result, the right opening/closing mechanism 21 returns to the proper state that the opening/closing mechanism 21 was in before being erroneously operated.

Even when the left lid 17 is erroneously operated as described above to disengage the engaged portion 48 from the engaging portion 38 diagonally upward, the engaged portion 48 is reengaged with the engaging portion 38 by pushing and tilting the lid 17 toward the opened position in the clockwise direction.

In addition to the above advantages, the present embodiment has the advantages described below.

In the structure in which the opening/closing mechanisms 21 and 22 are respectively provided for the two lids 15 and 17 that are arranged next to each other in the widthwise direction, the drive rack 23, the supports 25, the elastic member 27, and the sliding restriction portions 28 and 29 of one of the opening/closing mechanisms 21 (22) serve as the drive rack 23, the supports 25, the elastic member 27, and the sliding restriction portions 28 and 29 of the other one of the opening/closing mechanisms 22 (21). This reduces the number of components of the console box 10 as compared to when the drive rack 23, the elastic member 27, and the sliding restriction portions 28 and 29 are used exclusively for each of the opening/closing mechanism 21 and 22.

Figure 3C:
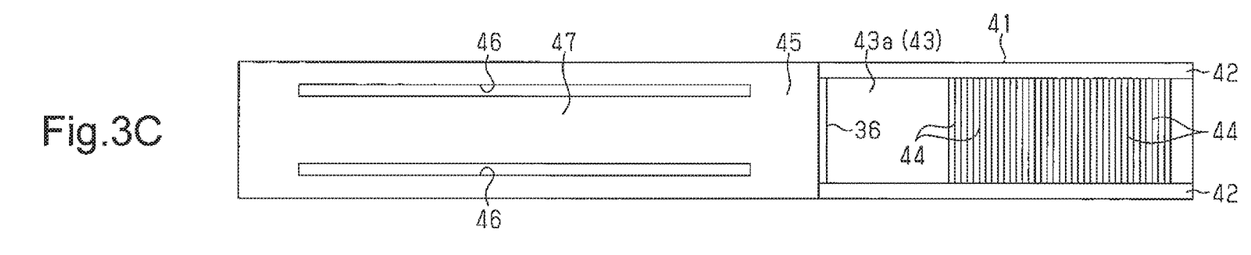
FIG. 3C is a bottom view showing the main rack coupled to the sub-rack.

The elastic deformability of the flexible portion 47 is adjustable by changing at least one of the width and length of the two slits 46 shown in FIGS. 3C and 4C.

It should be apparent to those skilled in the art that the present invention may be embodied in many other specific forms without departing from the spirit or scope of the invention. Particularly, it should be understood that the present invention may be embodied in the following forms.

The console box may be applicable to a type of console box that entirely opens and closes an opening portion with two lids that are arranged next to each other in the front-to-rear direction instead of the widthwise direction.

The console box may be applicable to a type of console box that uses a single lid to entirely open and close an opening portion.

Instead of the slits 46 of the above embodiment, recesses that do not extend through the lower horizontal wall 45 may be arranged. The recesses open in one of the upper surface and the lower surface of the lower horizontal wall 45. In this case, the region of the lower horizontal wall 45 between the two recesses forms the flexible portion 47. Even when the slits 46 are changed to the recesses in this manner, the lower horizontal wall 45 includes the flexible portion 47 that is more elastically deformable than other portions.

In this case, the elastic deformability of the flexible portion 47 is adjustable by changing at least one of the depth, width, and length of the two recesses.

The teeth 32 may be arranged on the entire outer circumference of each first pinion 31. Alternatively, the teeth 32 may be arranged only at portions of the outer circumference of the first pinion 31 that mesh with the teeth 44 when the lids 15 and 17 are tilted.

In the same manner, the teeth 35 may be arranged on the entire outer circumference of each second pinion 32. Alternatively, the teeth 35 may be arranged only at portions of the outer circumference of the second pinion 32 that mesh with the teeth 24 and 37 when the lids 15 and 17 are tilted.

Components used as the main rack 36 and the sub-rack 41 may be structured reversely from the above embodiment. That is, the main rack 36 may be box-shaped and open at least in the two longitudinal ends of the main rack 36, and the sub-rack 41 may have the form of an elongated shape. In this case, the supports support the main rack 36 in a diagonally slidable manner and the sub-rack 41 is supported in the main rack 36 in a slidable manner.

These modifications have the same advantages and effects as the above embodiment.

In contrast to the above embodiment, the engaging portion 38 may be formed by a recess instead of a projection. In this case, the engaged portion 48 is formed by a projection that engages the engaging portion 38 instead of a recess.

A type of spring that differs from a coil spring may be used as the elastic member under the condition that the elastic member accumulates elastic energy through deformation. Alternatively, a member that is formed by an elastic material such as rubber or elastomer may be used as the elastic member.

The present examples and embodiments are to be considered as illustrative and not restrictive, and the invention is not to be limited to the details given herein, but may be modified within the scope and equivalence of the appended claims.

The invention claimed is:

1. A console box comprising:
a box body that includes an opening portion;
a lid supported by a hinge shaft on the box body; and
an opening/closing mechanism that tilts the lid between an opened position where the lid opens the opening portion and a closed position where the lid closes the opening portion;
wherein the opening/closing mechanism includes
a first pinion arranged on the hinge shaft and integrally rotatable with the hinge shaft,
a second pinion separated from the first pinion and supported rotatably,
a main rack that meshes with the second pinion and slides when the second pinion rotates, and
a sub-rack that meshes with the first pinion and slides on the main rack;
the main rack includes an engaging portion;
the sub-rack includes an engaged portion;
when the lid is tilted between the opened position and the closed position, the engaged portion engages the engaging portion and restricts sliding of the sub-rack on the main rack, and
when the lid is further tilted from the closed position in a closing direction in which the lid closes the opening portion and when the lid is further tilted from the opened position in an opening direction in which the lid opens the opening portion, the engaged portion is disengaged from the engaging portion to cancel the restriction imposed on the sub-rack by the main rack.

2. The console box according to claim 1, wherein
the sub-rack includes a flexible portion that elastically deforms toward the engaging portion of the main rack and away from the engaging portion, and
the flexible portion includes the engaged portion of the sub-rack.

3. The console box according to claim 2, wherein
the sub-rack includes two slits extending in a sliding direction of the sub-rack with the two slits separated from each other, and
the flexible portion includes a region of the sub-rack that is located between the two slits.

4. The console box according to claim 2, wherein
the sub-rack includes two recesses extending in a sliding direction of the sub-rack with the two recesses separated from each other, and
the flexible portion includes a region of the sub-rack that is located between the two recesses.

5. The console box according to claim 1, wherein
the sub-rack is elongated and box-shaped and at least opens at two longitudinal ends,
the console box further includes a support that supports the sub-rack at the box body in a slidable manner, and
the main rack is an elongated plate, wherein the main rack is arranged in the sub-rack so that the main rack is slidable on the sub-rack in a longitudinal direction of the sub-rack.

6. The console box according to claim 1, wherein
when the lid is further tilted from the closed position in the closing direction thereby disengaging the engaged portion from the engaging portion, the engaged portion is reengaged with the engaging portion by tilting the lid toward the closed position, and
when the lid is further tilted from the opened position in the opening direction thereby disengaging the engaged portion from the engaging portion, the engaged portion is reengaged with the engaging portion by tilting the lid toward the opened position.

7. The console box according to claim 1, wherein the opening/closing mechanism further includes
a drive rack that meshes with the second pinion, wherein the drive rack slides when the lid is tilted between the opened position and the closed position, and
an elastic member that biases the drive rack in a direction in which the drive rack slides when the lid is tilted toward the opened position.

8. The console box according to claim 7, wherein
the opening/closing mechanism further includes a sliding restriction portion that allows the drive rack to slide when the lid is tilted between the opened position and the closed position and restricts sliding of the drive rack when the lid is further tilted from the closed position in the closing direction and when the lid is further tilted from the opened position in the opening direction.

9. The console box according to claim 7, wherein
the box body is coupled to a vehicle,
the lid is one of two lids arranged next to each other in a widthwise direction of the vehicle,
the opening/closing mechanism is one of two opening/closing mechanisms respectively provided for the two lids, and
the drive rack of one of the two opening/closing mechanisms and the drive rack of the other one of the two opening/closing mechanisms are formed by a common member.

* * * * *